United States Patent [19]

Hwang

[11] 4,229,747
[45] Oct. 21, 1980

[54] WATER BASED PERMANENT JET PRINTING INK AND METHOD OF USE

[75] Inventor: Ki-Sup Hwang, Xenia, Ohio

[73] Assignee: The Mead Corporation, Dayton, Ohio

[21] Appl. No.: 44,738

[22] Filed: Jun. 1, 1979

[51] Int. Cl.$^2$ .............................................. G01D 15/18
[52] U.S. Cl. .................................. 346/1.1; 106/22; 346/140 R
[58] Field of Search .................... 346/75, 140, 1.1; 106/20, 22, 23

[56] References Cited

U.S. PATENT DOCUMENTS

| | | | |
|---|---|---|---|
| 3,705,043 | 12/1972 | Zabiak | 106/20 |
| 3,846,141 | 11/1974 | Ostergren | 106/22 |
| 3,870,528 | 3/1975 | Edds | 106/22 |
| 3,889,269 | 6/1975 | Meyer | 346/1.1 |

FOREIGN PATENT DOCUMENTS

| | | |
|---|---|---|
| 2555296 | 9/1976 | Fed. Rep. of Germany . |
| 1494768 | 12/1977 | United Kingdom . |

OTHER PUBLICATIONS

Edds et al.; Void Displacement Fast-Drying Process for Ink Jet Printer Ink; IBM Tech. Disc. Bulletin, vol. 18, No. 4, Sep. 1975, p. 1099.

*Primary Examiner*—Joseph W. Hartary
*Attorney, Agent, or Firm*—Biebel, French & Nauman

[57] ABSTRACT

An improved jet printing ink for use in jet drop printers and copiers is provided. The composition comprises an aqueous solution of a water soluble or solvent soluble dye, an organic chemical solvent comprising a glycol ether having 8 to 12 carbon atoms, a bridging agent for solubilizing the solvent and dye in solution comprising an ethoxylated higher alcohol amine-amide, a humectant, and a defoaming agent.

The ink runs well in a multi-jet printer and will not dry out or clog printing head orifices even if left in the printing head for an extended period. The ink is fast drying on paper once printed and is smudge and light resistant.

10 Claims, No Drawings

WATER BASED PERMANENT JET PRINTING INK AND METHOD OF USE

BACKGROUND OF THE INVENTION

This invention relates to printing inks and more particularly to printing inks suitable for use in jet drop printers of the type disclosed in Van Breemen et al, U.S. Pat. No. 4,080,607, and jet drop copiers of the type disclosed in Paranjpe et al, U.S. Pat. No. 4,112,469. Such printers print on high speed moving webs or on print media supported on a rotary drum by selective charging and catching of drops generated at a frequency on the order of about 120 KHz by streams of drops issuing from 500 or more orifices. These orifices have a diameter of less than 2 mils, and in some instances, less than 1 mil, which requires the printing ink to be free of anything but the very smallest particulate matter. Generally, the ink must be operable after filtering through a 3 micron filter and preferably should be able to undergo filtering through a 0.54 micron filter.

Further, for use in such printers the ink must be electrically conductive and have a resistivity below about 1,000 ohm cm, and preferably below about 500 ohm cm. For good runnability through small orifices, the ink should have a viscosity in the range between about 1 to 10 centipoise at 25° C. In addition, the ink must be stable over a long period of time, compatible with the materials comprising the orifice plate and ink manifold, free of living organisms, and functional after printing. The functional characteristics after printing include smear and fade resistance, fast drying on paper (i.e., less than one second), and waterproof when dry.

When the ink is to be used in a jet drop copier, one other important property is required. Because start-up in a jet drop copier must be essentially instantaneous, ink is maintained in the ink supply manifold of the printing head for extended periods of time (e.g., up to two weeks). Therefore, an important property of an ink to be used in a jet drop copier is that it exhibit a very low vapor pressure and will not dry out when in the printing head.

It will be appreciated that it is quite difficult to provide an ink which performs as required after printing and yet is suitable for use in jet drop printers and copiers. Generally speaking, waterbase inks have been found to be most suitable because of their conductivity and viscosity range. However, even these ink formulations have tended to be a compromise between required properites. For example, several prior art water-base inks were not suitable for use in jet drop printers because they dried and tended to crystalize in and clog the small orifices in such printers. Use of organic solvent-base inks presented worse drying problems than those of aqueous base inks, and were undesirable for use in jet drop printers because of high evaporation rates, flammability, odor, and toxicity problems. It was discovered that humectants such as glycerine could be added to waterbase inks to reduce their tendency to dry out, but this increased the viscosity of such inks to the extent that they were unsuitable for rapid flow through the small orifices.

Improvements have been made, however. Meyer et al, U.S. Pat. No. 3,889,269, teaches that the addition of a hydroxyalkyl formamide to a waterbase jet printing ink prevents premature drying of the ink without an increase in viscosity. Edds et al, U.S. Pat. No. 3,870,528, discloses a combination of dyes which are taught to be stabilized against agglomeration by the addition of polyethylene glycol and N-methyl-2-pyrrolidone or diethylene glycol monoethyl ether. Ostergren et al, U.S. Pat. No. 3,846,141, discloses the addition of a mixture of a lower alkoxytriglycol and polyethylene glycol, a lower alkyl ether of diethylene glycol, or glycerol as a humectant in a jet printing ink. Both Zabiak, U.S. Pat. No. 3,705,043, and British Pat. No. 1,494,768, teach the addition of alkylene glycols and/or alkyl ethers of alkylene glycols as humectants to jet printing ink compositions. Finally, German published patent application No. 2,555,296, teaches a waterbase jet printing ink composition containing a water insoluble dyestuff and an organic chemical solvent solubilized by a complex former consisting of a diethanol or triethanolamine salt of a long-chain fatty acid and an aromatic anionic wetting agent.

However, such inks have not been entirely satisfactory in use in jet drop printers and particularly in jet drop copiers which require an ink which will not dry out in the printing head for extended periods of time. Accordingly, the need still exists in the art for a jet drop printing ink composition which will not agglomerate or dry out in the print head and yet which drys fast once printed and is smudge and water resistant.

SUMMARY OF THE INVENTION

In accordance with this invention there is provided an improved jet printing ink suitable for use in multi-jet printers and copiers. It comprises an aqueous solution of a water or solvent soluble dye, an organic chemical solvent comprising a glycol ether having 8 to 12 carbon atoms, and a strongly hydrophilic solubilizing agent comprising an ethoxylated higher alcohol amine-amide phosphate compound. The ratio of glycol ether to solubilizing agent is preferably about 1:1 to 1:2 to render the dye miscible in any proportion of water, and the overall concentrations of glycol ether and solubilizing agent are between 1 percent and 6 percent, and preferably about 2.5 percent. Dyes which are suitable for use in the invention include direct dyes, solubilized sulfur dyes, and fluorescein dyes.

The jet printing ink composition may also contain humectants, bacteriacides, and defoamers. Hydroxylated aliphatic amides have been found to be useful as humectants. These humectants are present in the ink formulation in an amount from about 10 percent to about 40 percent by weight, preferably 20 percent. The defoaming agent may comprise a copolymer of a polyhydric alcohol and silicone and may be present in the ink formulation in an amount from about 0.1 percent to 1.0 percent, preferably 0.3 to 0.5 percent.

Accordingly, it is an object of this invention to provide a novel and improved printing ink suitable for use in jet drop printers and copiers which will not dry out in a jet drop printing head and yet is fast drying on paper and waterproof and smudge resistant when dry. This and other objects and advantages of the invention will become apparent from the following description and appended claims.

DESCRIPTION OF THE PREFERRED EMBODIMENTS

A jet printing ink produced in accordance with this invention will be suitable for use in both high speed multi-jet printers and jet drop copiers. The basic components of the composition include an aqueous solution of a water or solvent soluble dye, an organic chemical solvent for the dye which acts to stabilize the dye in solution but which is itself insoluble in water, a highly hydrophilic solubilizing agent which will form a loose complex with the dye and organic solvent to render them soluble in water, and a humectant to prevent the composition from drying out.

It has been found that printing inks formulated according to this invention exhibit all of the required properties of a good jet drop printing ink. The optical density of the ink is greater than 1.2 to render it easily readable after printing, the viscosity of the ink is between 1.5 and 10 centipoise, and its resistivity is less than 1,000 ohm cm. The ink is free of particulate matter greater than 2 microns in diameter and has no tendency to agglomerate during storage. The pH of the ink is adjusted to between 7 and 7.5 to render it compatible with the materials it comes into contact with during operation including any piping, the ink supply tank and manifold, and the orifice plate. If a beryllium-copper alloy is used for the orifice plate, care must be taken to maintain the pH of the ink composition below about 8 because of the alloy's sensitivity to higher pHs.

Although the ink will remain stable and will not dry out for periods of up to two weeks while stored in the printer, once printed onto paper, it will dry in less than one second. After drying, the ink is smudge and light resistant as well as waterproof.

For the dye component of the composition, various water soluble as well as solvent soluble dyes have been found to be suitable. Where a black dye is chosen to provide easy readability of the printed information, direct black RB, a mixture of C. I. direct blue 15, C. I. direct yellow 34, and C. I. direct red 81 dyes, and available from the Sandoz Chemical Co., is a useful dye which will not react chemically with any of the other components used in the composition and will not yield any undesirable solids. Other water soluble direct dyes, including C. I. direct yellow 133 and C. I. direct orange 118 have also been found useful in the practice of the invention. Concentration of these dyes in the overall composition should be in the range of from 1 percent to 10 percent by weight.

If desired, infrared or ultraviolet absorbing dyes may also be used in the ink composition. These dyes include C. I. solubilized sulfur black (C. I. 53186) and acid yellow 73. Solvent soluble dyes such as C. I. solvent black 3 may also be used. In general, dyes used in the invention should be stable to light, nonreactive with other components in the composition, and resist agglomeration.

To insure that the dye component of the ink composition remains in solution, an organic chemical solvent is included. This solvent should have excellent solvency powers with respect to both water soluble and solvent soluble dyes and should itself have a very slow evaporation rate. It has been found that glycol ethers having 8 to 12 carbons atoms are quite suitable solvents. They have high boiling points ranging from 338° F. to 473° F. and exhibit very low vapor pressures of less than 0.6 mmHg at 20° C. The glycol ether chosen should also have a solubility in 100 grams of water of less than 5 grams. Both ethylene glycol phenyl ether and diethylene glycol hexyl ether are excellent solvents for the dyes used in this invention. The use of these solvents has been found to result in jet printing inks that are waterfast on paper when printed. Excellent results have been obtained using such glycol ethers in amounts ranging from 1 percent to 6 percent, and preferably about 2.5 percent, by weight in the overall composition.

Because of the poor miscibility with water of the glycol ethers used in the practice of the invention, a bridging agent is required in the ink composition to completely solubilize them and provide a single aqueous phase ink composition. The bridging agent should be strongly hydrophilic in character and capable of solubilizing the particular organic chemical solvent used in the ink composition. It has been found that an ethoxylated higher alcohol amine-amide phosphate compound available under the trade name Polycomplex Y from the Guardian Chemical Corp. of hauppauge, New York, exhibits the required properties. It appears that Polycomplex Y forms a weak bond with the glycol ether solvent rendering the complex soluble in water. Addition of from 1 percent to 6 percent, and preferably about 2.5 percent by weight of this bridging agent to the ink composition insures complete miscibility of all components with water forming a single phase aqueous solution. The weight ratio of glycol ether to the bridging agent should be maintained at between 1:1 and 1:2 to insure satisfactory results. Addition of bridging agent in excess of this ratio serves only to increase the viscosity of the composition which is not desirable.

Because of the importance of preventing the drying out of a jet drop printing ink formulation, a humectant should also be added to the composition. However, addition of some prior art humectants such as ethylene glycol, diethylene glycol, glycerine, or the like increase the viscosity of the ink. This increased viscosity is undesirable for two reasons. First, jet drop printing systems form streams of ink drops by forcing the ink through extremely fine orifices. A high viscosity ink cannot be made to flow sufficiently fast to maintain the ink flow necessary for high speed printing. Second, such inks have a tendency to produce nonuniformly sized drops resulting in nonuniform flight times which result in visible printing errors on paper.

However, hydroxyalkyl formamides have proved to be excellent humectants while not adversely increasing the viscosity of the ink composition. It is for this reason that hydroxyalkyl formamide compounds are the humectants used in the practice of this invention. Such compounds are available under the name Nopco G5-15 from the Diamond Shamrock Corp. It has been found that the compounds should be added to the ink composition in amounts ranging from about 10 percent to about 40 percent by weight of the overall composition, with 20 percent being the preferred amount. This amount of humectant is in excess of amounts utilized in prior art aqueous based jet printing inks. However, because of the demands of high speed jet drop copying systems, the ink must have the capability of remaining in the printing head of a copier for extended periods of time without drying out and clogging orifices.

If foaming problems occur during use of the ink composition of this invention, a small amount of a defoaming agent may be added to alleviate the problem. However, the defoaming agent must be dispersible in an aqueous solution to the extent that it will pass through a 1.2 micron filter through which the ink composition passed prior to use. Additionally, the defoamer must resist any tendency to congeal or agglomerate and must have a sufficient spreading coefficient to dissipate the foam. It has been found that a copolymer of a polyhydric alcohol and silicone available under the name Foambreaker from the Guardian Chemical Corp. of Hauppague, New York, satisfies the above requirements. It may be added to the ink formulation in an amount of about 0.1 percent to 1.0 percent, and preferably 0.3 to 0.5 percent by weight.

The sequence in which the components of the printing ink of the present invention are mixed together is critical. When using solvent soluble dyes, the dye, organic solvent, and bridging agent should be mixed together, the desired amount of water added, and then the humectant and defoamer added to result in the correct concentration of components. In case of other dyes, the organic solvent and bridging agent should be mixed with water, with the dyes and remaining chemicals added directly. The following nonlimitative examples are offered to illustrate the practice of this invention, all percentages being given by weight.

EXAMPLE I

| Ethylene glycol phenyl ether | 2.5 percent |
|---|---|
| Polycomplex Y | 2.5 |
| Deionized, distilled water | 71.0 |
| Hydroxyethylformamide | 20.0 |
| Direct black RB | 4.0 |

The viscosity of this ink is 2.1 centipoise at 20° C. and has a pH between 7.0 and 7.5. The ink was tested by placing it in the ink supply reservoir of an ink jet printer of the type disclosed in Van Breemen et al, U.S. Pat. No. 4,080,607. The ink was ejected from a series of orifices and formed streams of droplets. These streams of droplets passed through a series of charge rings which differentially charged the droplets. The droplets than passed through an electrostatic deflection field where charged drops were selectively deflected into a catcher. The uncharged droplets were deposited in a predetermined pattern on a moving substrate as taught by the above patent.

An image printed with this ink was tested by immersion in water for 72 hours; the image remained waterfast. Heating the ink to 45° C. did not cause any agglomeration or precipitation to occur.

EXAMPLE II

| Ethylene glycol phenyl ether | 2.5 percent |
|---|---|
| Polycomplex Y | 2.5 |
| Deionized, distilled water | 70.25 |
| Hydroxyethylformamide | 20.0 |
| Direct Black RB | 4.0 |
| Direct orange 118 | 0.75 |

The addition of direct orange 118 made the ink blacker and produced a darker image.

EXAMPLE III

| Ethylene glycol phenyl ether | 2.5 percent |
|---|---|
| Polycomplex Y | 2.5 |
| Deionized, distilled water | 69.95 |
| Hydroxyethylformamide | 20.0 |
| Direct black RB | 4.0 |
| Direct orange 118 | 0.75 |
| Foambreaker | 0.3 |

The addition of the small amount of defoaming agent served to control any foaming problems with the ink.

What is claimed is:

1. A jet drop printing process utilizing a water base permanent jet printing ink comprising:
   a. ejecting at high speed from an orifice or orifices an ink composition comprising: a water or solvent soluble dyestuff present in the ink in the range of from about 1 percent to about 10 percent by weight, an alkylene glycol ether as a solvent for said dyestuff and having from 8 to 12 carbon atoms and present in the ink in the range from about 1 percent to about 6 percent by weight, an ethoxylated higher alcohol amine-amide phosphate as a bridging agent for the dyestuff and glycol ether rendering them soluble in water and present in the ink in the range from about 1 percent to about 6 percent by weight, a hydroxylated aliphatic amide as a humectant and present in the ink in the range from about 10 percent to about 40 percent by weight, and the balance water, so that said ink composition issuing from said orifice or orifices breaks into droplets;
   b. passing said stream of droplets through a charge ring to thereby differentially charge said droplets;
   c. selectively deflecting said differentially charged droplets and directing them toward a substrate positioned so as to receive at least a portion of said differentially charged droplets; and
   d. depositing at least a portion of said droplets in a pattern on said substrate, whereby a permanent, fast drying, smudge and light resistant printed pattern is formed on said substrate.

2. A jet printing ink comprising:
   a water or solvent soluble dyestuff present in the ink in the range of from about 1 percent to about 10 percent by weight,
   an alkylene glycol ether as a solvent for said dyestuff and having from 8 to 12 carbon atoms and present in the ink in the range from about 1 percent to about 6 percent by weight,
   an ethoxylated higher alcohol amine-amide phosphate as a bridging agent for the dyestuff and glycol ether rendering them soluble in water and present in the ink in the range from about 1 percent to aobut 6 percent by weight,
   a hydroxylated aliphatic amide as a humectant and present in the ink in the range from about 10 percent to about 40 percent by weight, and
   the balance water.

3. The jet printing ink of claim 2 in which said alkylene glycol ether and said ethoxylated higher alcohol amine-amide phosphate are present in a weight ratio of from about 1:1 to 2:1.

4. The jet printing ink of claim 3 in which said alkylene glycol ether is selected from the group consisting of ethylene glycol phenyl ether and diethylene glycol hexyl ether.

5. The jet printing ink of claim 4 in which said dyestuff is water soluble.

6. The jet printing ink of claim 5 in which said dyestuff is selected from the group consisting of C. I. direct blue 15, C. I. direct yellow 34, C. I. direct yellow 133, C. I. direct red 81, C. I. direct orange 118, and mixtures thereof.

7. The jet printing ink of claim 2, further comprising a copolymer of a polyhydric alcohol and silicone as a defoaming agent and present in the ink in the range of from about 0.1 percent to 1.0 percent by weight.

8. The jet printing ink of claim 2 in which the pH of the composition is adjusted to between 7 and 7.5.

9. A jet printing ink comprising:
about 4.75 percent by weight of a water soluble direct dye,
about 2.5 percent by weight of ethylene glycol phenyl ether,
about 2.5 percent by weight of an ethoxylated higher alcohol amine-amide phosphate,
about 20 percent by weight of a hydroxy-alkyl formamide,
and the balance water.

10. The jet printing ink of claim 9 further comprising about 0.3 percent by weight of a copolymer of a polyhydric alcohol and silicone.